June 12, 1962  CHIEH CHIEN CHANG  3,039,014
SUPERFAST THERMALIZATION OF PLASMA
Filed July 5, 1960  3 Sheets-Sheet 1

INVENTOR.
CHIEH CHIEN CHANG
BY
Roland G. Anderson
ATTORNEY

INVENTOR.
CHIEH CHIEN CHANG
BY
Roland A. Anderson
ATTORNEY

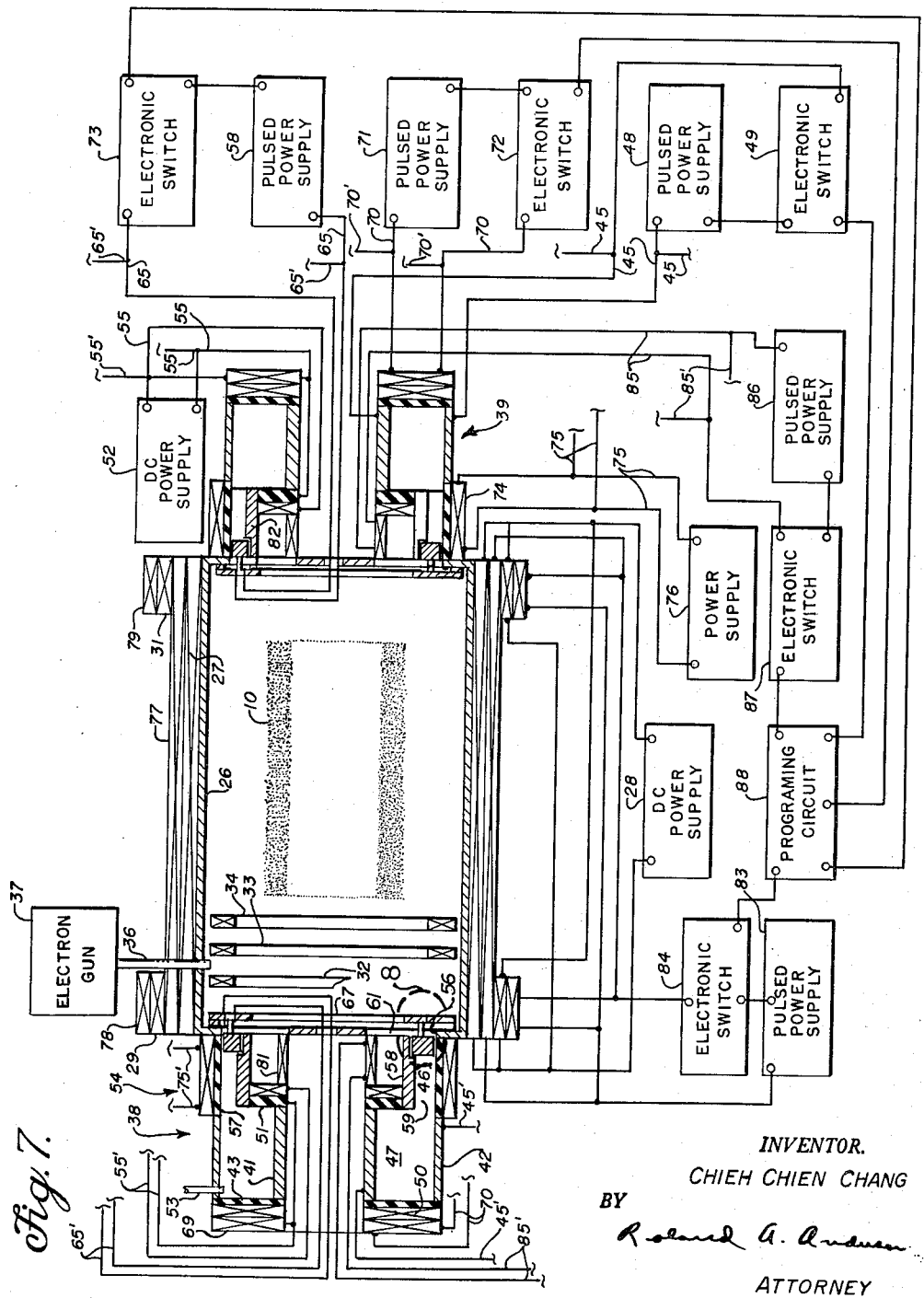

United States Patent Office 3,039,014
Patented June 12, 1962

3,039,014
SUPERFAST THERMALIZATION OF PLASMA
Chieh Chien Chang, Minneapolis, Minn., assignor to the United States of America as represented by the United States Atomic Energy Commission
Filed July 5, 1960, Ser. No. 40,973
5 Claims. (Cl. 313—161)

The present invention relates to the production of a high temperature gas or plasma, and is particularly directed to methods and apparatus for heating plasma through programmed compression and collision processes within and between rotating plasmoid pairs with a substantial conversion of plasma kinetic energy into heat.

It has recently become of importance in the field of nuclear physics to raise a gas to high temperature and density operating conditions for purposes of high temperature spectroscopy, production of plasma jets for heating, propulsion, etc. Low atomic number materials such as deuterium or deuterium-tritium mixtures can be heated to temperatures of sufficient magnitude and of a sufficient density to induce neutron productive nuclear fusion reactions therein, the use of which neutrons is well known. With adequate densities and thermalized kinetic temperatures the fusion reaction rate of the low atomic number ions increases to a level at which the power output of the reaction exceeds the power input. To these ends a number of devices have evolved and these devices have been generally termed "Controlled Fusion Devices" as described in volumes 31 and 32 of "The Proceedings of the Second International Conference on the Peaceful Uses of Atomic Energy, Geneva, 1958," a United Nations publication. Prominent among these devices as disclosed in the above-referenced publication as well as in the copending patent applications of Nicholas Christofilos, S.N. 337,994, filed February 20, 1953, now abandoned, and S.N. 756,044, filed August 19, 1958, is that known as "Astron." Astron devices basically include a solenoidal coil constructed and arranged to provide an axially symmetric magnetic field having a linear central region of uniform intensity and terminally disposed regions of increased intensity. Electron sources direct a beam of energetic electrons into said magnetic field for example at a slight angle to a plane of reference normal to said field between a set of solenoidal injection coils excited with a periodically varying current to create a local variation in the magnetic field effecting trapping of the electrons to form a cylindrical layer of electrons rotating in the magnetic field and commonly termed an E-layer. Neutral gaseous atoms are introduced into the field region and are ionized and heated by interaction with the electrons and the heated ions are trapped in the electromagnetic field pattern produced by the electron layer rotating within the axially symmetric magnetic field, thus forming a contained high temperature gas or plasma. The nature of the gas introduced, as well as the temperature and density operating conditions utilized depend upon the results desired, for example, any of the results noted hereinbefore. By virtue of the singular relativistic electron heating mechanism employed, a conventional Astron device is necessarily operated steady state in order that sufficient heating be imparted to the plasma to raise same to the desired high temperatures. Attendant to the steady state operation are a number of limitations and disadvantages which while not being insurmountable are nevertheless undesirable. Since the plasma is continuously heated, cooling of the surrounding plasma chamber walls becomes a paramount problem. Moreover, the size of the E-layer required for steady state operation is inherently large such that thermal radiation losses from the plasma are substantial. Furthermore plasma leakage from the ends of the electromagnetic field configuration produced by the layer of relativistic electrons rotating within the magnetic field can be limiting upon the efficiency with which the plasma is heated.

To overcome these disadvantages and limitations of steady state operation of Astron devices, I have provided a method and apparatus for the transient or intermittent operation of such a device. More particularly, I have provided for the production of plasma in the form of rotating plasmoids, viz., rotating plasma rings, with tremendous kinetic energy stored in the rotation thereof, the pulsed introduction of such plasmoids at substantially supersonic speed to the opposite ends of an E-layer rotating in an axially symmetric magnetic field having gradientally intensified terminal mirror field regions whereby the plasmoids collide within the E-layer to form a strong shock wave to convert their kinetic energy into heat, and the simultaneous radial and axial magnetic compression of the E-layer and plasmoids introduced thereto with further heating of the plasma by adiabatic compression processes and interaction with the relativistic electrons at an accelerated rate. By virtue of the compression of the E-layer and injected plasma, they possess a relatively small exposed surface area and volume.

The invention also contemplates the heating of plasma by the foregoing compression and collision processes of rotating plasmoid pairs in an axially symmetric magnetic mirror field exclusive of an E-layer, the overall plasma heating process being substantially the same except for the heating arising from interaction wth the relativistic electrons of the E-layer.

Accordingly, it is among the objects of the present invention to provide for the pulsed injection and pulsed operation of an Astron device with an accelerated heating process of the plasma by the relativistic electrons.

It is another object of the invention to minimize thermal radiation losses from the plasma and E-layer of an Astron device by pulsed reduction of their volumes and exposed surfaces.

Still another object of the invention is the provision of a device wherein plasma is transiently introduced to a rotating layer of relativistic electrons in a magnetic field such that heating of surrounding plasma reaction chamber walls is not sustained and accordingly the cooling requirements thereof are not critical.

Still another object of the present invention is the provision of method and apparatus of the class described wherein plasma leakage is minimized by the centrifugal force of the rotating electrons and rotating plasma.

It is yet another object of the invention to provide a method and apparatus of the class described whereby very few run away electrons diffuse out of the reaction zone by virtue of the organized rotational motion of the relativistic electrons and rotating plasma.

It is a further object of the invention to provide an Astron device and method of operating same whereby the size of the device and the material requirements of the E-layer and magnetic field generating apparatus may be substantially minimized.

It is an even further object of my invention to provide a method and apparatus for the periodic injection of rotating plasmoids into the opposite ends of an electromagnetic particle containment field configuration and the conversion of the kinetic energy stored in the plasmoid rotation to heat in the plasma mass arising from collision of the plasmoids.

A still further object of the invention is to provide for the introduction of rotating plasmoids to the opposite ends of an axially symmetric magnetic field having axially spaced gradientally intensified terminal regions therein (viz., a magnetic mirror containment field), magnetic compression of the plasmoids, and conversion of the kinetic energy of the plasmoids to heat in the magnetically confined plasma mass arising from collision of the plasmoids.

Other objects and advantages of the invention will become apparent by consideration of the following description taken in conjunction with the accompanying drawing of which:

FIGURE 7 is a longitudinal sectional view with electrical components shown in schematic of preferred apparatus for conducting the plasma heating method of the invention.

Figure 1:
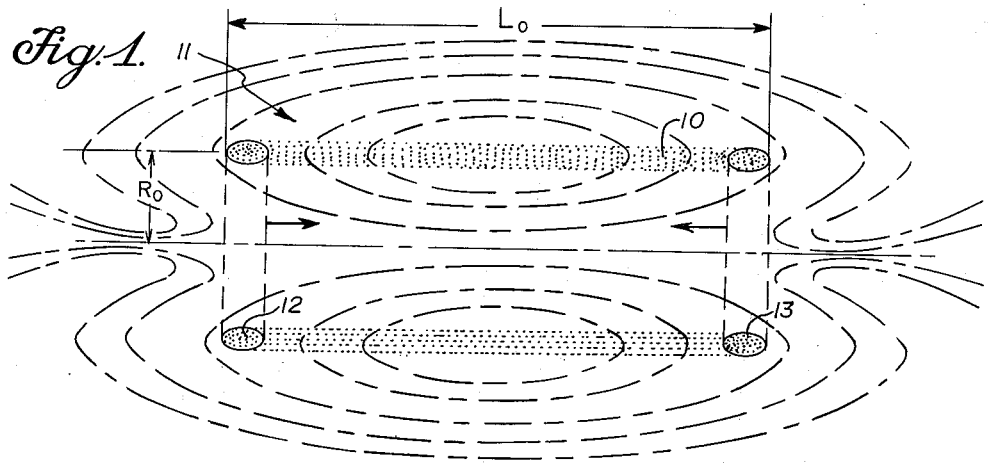
FIGURE 1 is a schematic illustration of a cylindrical layer of relativistic electrons (E-layer) rotating in a magnetic field and rotating plasmoids for injection into the opposite ends of the layer during the initial stages of the method of the present invention.

In general the present invention contemplates the raising of gaseous material in the form of a plasma to very high temperature, the heated plasma being confined by the non-material medium of an electromagnetic or magnetic containment field such that nuclear reactions productive of neutrons may occur between the plasma constituents. Various containment fields may be employed in the carrying out of the heating process and prominent among such fields are the magnetic mirror field configuration of magnetic mirror machine (Pyrotron) devices and the closed electromagnetic reversed field configuration of Astron devices. For diagrammatic illustrations and comprehensive descriptions of these field configurations, reference may be had to pages 59 and 151, respectively, of Project Sherwood, by Amasa S. Bishop, Addison-Wesley Publishing Co., Inc., Reading, Mass., U.S.A. Briefly, a magnetic mirror field is an axially symmetric magnetic field having a central region of substantially uniform intensity terminally bounded by end regions of increased intensity which is effective in confining plasma in the central region thereof. An Astron closed electromagnetic reversed field configuration, on the other hand, is the closed configuration of field lines produced by interaction of a magnetic field of substantially the same configuration as a mirror field with that of a rotating cylindrical layer of high energy electrons, viz., an E-layer, the field lines reversing direction in the central region and closing completely upon themselves to be thereby extremely effective in confining plasma therein.

Considering now the method of the invention, first with reference to its conduct in an Astron electromagnetic closed field configuration, an E-layer 10 is first established within an axially symmetric magnetic field having terminal regions of increased intensity and generated in a substantially evacuated space. The field of the E-layer and the axially magnetic field produce a closed electromagnetic field configuration 11 in accordance with the basic Astron concept. The E-layer 10 may be established, for example, in the same manner as in conventional Astron type plasma devices as disclosed in the aforementioned copending patent applications of Nicholas Christofilos, Serial Numbers 337,994 and 756,044, or as disclosed in the later copending continuation-in-part application of Christofilos, Serial No. 4,586(60) relating to an E-layer injector. Briefly as disclosed in the above copending applications, an elongated cylindrical vessel arranged for evacuation is provided and an energized solenoid is disposed about the vessel to provide the axially symmetric magnetic field therein with the solenoid having a uniform ampere-turns distribution along the central length of the vessel to provide a uniform linear central field region. In the end regions of the vessel the ampere-turns distribution relative to length is increased and additional reflecting or magnetic mirror field coils may be provided in order to produce terminally intensified, i.e., magnetic mirror field, regions bounding the uniform linear central field region. Anyone of the E-layer injectors disclosed in said copending applications may be employed to appropriately inject energetic electrons to the axially symmetric magnetic field in such a manner that the electrons are trapped in the field to form the E-layer which is defined by the helical paths of the electrons rotating about the axis of symmetry of the field. As more and more electrons are injected to the field and accumulate in the layer, the magnetic field is appropriately adjusted with the initial radius of gyration $R_0$ of the electrons of the E-layer 10 and the length $L_0$ thereof being determined by the intensity of the field in the central region and intensified end regions respectively.

In accordance with the salient aspects of the method of the invention, a pair of rotating plasma rings or plasmoids 12, 13 are first produced at the opposite ends of the E-layer 10. The plasma rings are rotated at very high velocity such that tremendous kinetic energy is stored in their rotation. Although various means may be employed to produce the rings 12, 13, it is preferred that rotating plasma sheets be first produced at each end of the E-layer by means of a homopolar generator substantially as disclosed in a copending application of William R. Baker et al., S.N. 736,647, which issued as U.S. Patent No. 2,997,641 on August 22, 1961, and relates to a homopolar capacitor. The rotating plasma sheets may then be accelerated proximally in coaxial relation to the axis of E-layer and formed into the rotating rings 12, 13, such rings being formed with radii $R_0$ and approaching each other coaxially within the E-layer. The acceleration and formation of the rings or plasmoids from the rotating plasma sheets is best accomplished magnetically by creating a strong pulsed magnetic field at the distal sides of the rotating plasma sheets relative to the ends of the E-layer to push the plasma sheets through annular passages leading to the ends of the E-layer. A strong radial magnetic field is in addition established across the passages and the plasma in passing therethrough interacts with the field to produce a Lorentz force which tries to slow down the motion of the plasma or to pinch the plasma into the rings prior to entering the ends of the E-layer. The Lorentz force generated by interaction of the rotational current of the plasma sheet passing through each passage with the radial magnetic field across the passage end also serves to accelerate each resulting ring at substantially supersonic speed through the end of the E-layer towards its center. The details of the apparatus for the formation and acceleration of the rotating plasmoids will be described in greater detail herein relative to apparatus of the invention.

Figure 2:
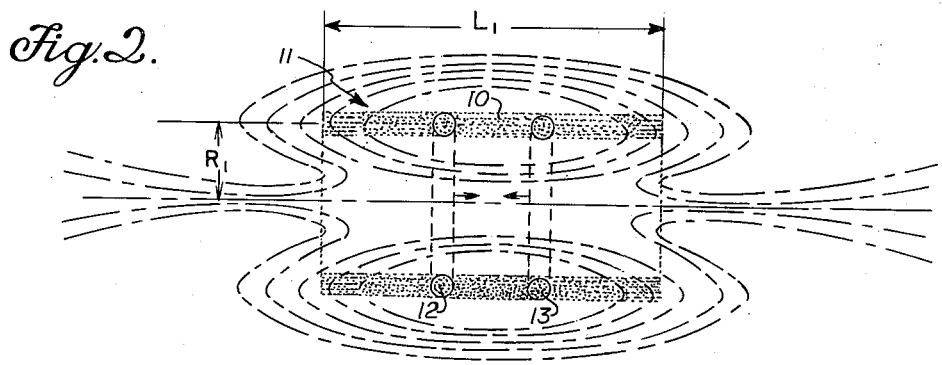
FIGURE 2 is an illustration similar to FIGURE 1 but illustrating the plasmoids moving proximally through the E-layer during the intermediate stages of the method.
Figure 3:
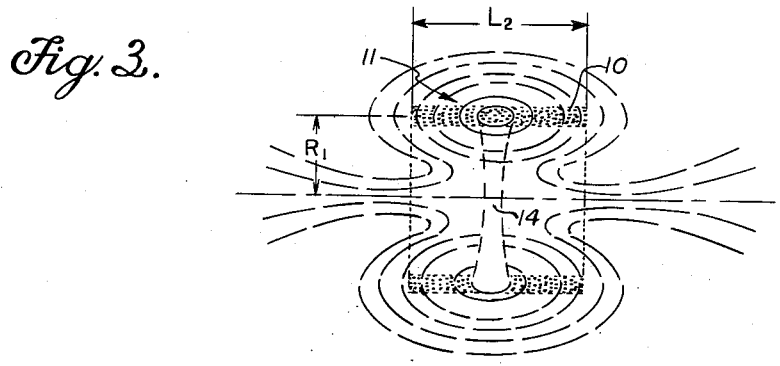
FIGURE 3 is a schematic illustration similar to FIGURES 1 and 2 but illustrating the plasma confined within the E-layer subsequent to collision of the plasmoids during the final stages of the method.

As the plasmoids 12, 13 pass through the opposite ends of the E-layer and move at substantially supersonic speed towards each other, the E-layer and approaching plasmoids are rapidly compressed to an intermediate radius $R_1$ and the E-layer to a length $L_1$ as depicted in FIGURE 2 of the drawing. Such compression of the E-layer and plasmoids results in adiabatic compression processes in the plasmoids with an increase in their plasma energy by virtue of increased rotational and axial velocities of the plasma particles arising from the compression. This compression of the E-layer and plasmoids is accomplished magnetically by rapidly increasing the intensity of the axially symmetric magnetic field both in the linear central region and terminally disposed regions of increased intensity thereof. Substantially simultaneously or slightly after the initial magnetic adiabatic compression of the plasmoids and compression of the E-layer the intensity of the terminal regions of the magnetic field is further increased resulting in further compression of the E-layer in the axial direction to a final length $L_2$ and further adiabatic compression of the plasma in the axial direction. The foregoing compression events are made to occur substantially simultaneously with collision of the approaching plasmoids 12, 13 such that they collide with a violent shock and create shock waves which dissipate their kinetic energy into heat in the resulting plasma mass 14 as depicted in FIGURE 3. The axially symmetric magnetic field of increased intensity further serves to establish with the E-layer 10 a final pattern of the electromagnetic field configuration 11 capable of confining the resulting high temperature or energetic plasma mass 14.

Inasmuch as the plasma mass 14 and relativistic electrons of the E-layer 10 are confined in a very small volume by virtue of the magnetic compression processes, the plasma density in the mass is extremely high whereby collisions and the number of distant encounters of charged plasma particles occur at significant rates. Furthermore, the compressed small volume has a small surface area for thermal radiation and hence thermal radiation loss of energy from the plasma is reduced to a minimum. Thereafter the already energetic plasma mass is further increased in temperature by the usual interaction of the plasma with the relativistic electrons of the E-layer in accordance with the fundamental Astron concept. Since the plasma temperature and density are both extremely high by virtue of the combined energization processes involved, the number of plasma particle collisions is extremely large and accordingly where deuterons, tritons, or other light particles are employed as plasma constituents, nuclear reactions occur therebetween at substantial rates with an attendant production of neutrons in copious quantities. With the foregoing pulsed method of operation, it will be appreciated that the amount of heating imparted to the plasma may be regulated substantially as large as desired depending upon the purpose for which the plasma is heated inasmuch as very much larger magnetic compression fields may be practicably employed in the pulsed operation than can be employed under continuous operating conditions as has been customary in Astron devices heretofore.

Other advantages of the method of the present invention relative to the operation of Astron devices are immediately apparent upon considering the transient aspects of the operation as well as the organized rotation of both the injected plasma and E-layer. Since the ultimate compression and heating of plasma and attendant nuclear reactions occurring therein occur over a very short space of time there is no appreciable heating of the vessel walls necessarily enclosing the low pressure plasma reaction region defined within the closed electromagnetic field configuration and hence complex cooling apparatus is not required. Owing to the extremely high velocity rotation of both the plasma and relativistic electrons there is such a high centrifugal force exerted on the plasma that practically no plasma is very near to the axis and can escape through the ends of the electromagnetic field configuration established by the E-layer and axially symmetric magnetic field. Similarly there are few run away electrons which diffuse out of the reaction zone because of the organized rotational motion. Hence plasma can be efficiently heated to extremely high temperature by virtue of the minimal radiation and particle losses from the reaction or final confinement region within the compressed E-layer.

Figure 4:
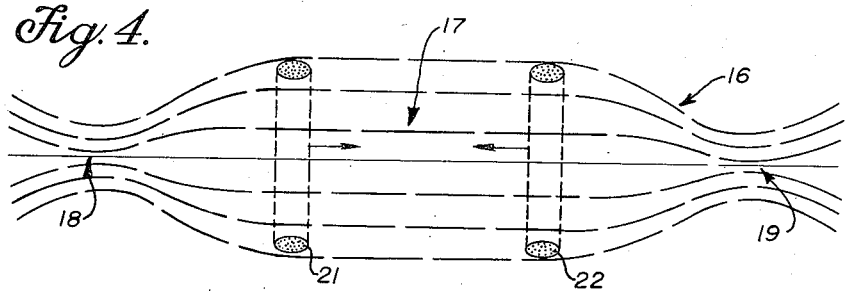
FIGURE 4 is a schematic illustration of the early stages of the invention as alternatively conducted in a magnetic mirror confinement field.

Although the method of the invention has been to this point described with particular reference to an E-layer and the combined closed electromagnetic confinement field configuration of the E-layer and an axially symmetric magnetic field of substantially magnetic mirror configuration, as indicated previously the method is also applicable to magnetic mirror confinement field configurations per se. More particularly, a magnetic mirror field 16 having a substantially uniform central region 17 bounded terminally by magnetic mirror regions 18, 19 of increased intensity may be established as indicated in FIGURE 4. The field 16 is similar in basic respects to that employed with E-layer 10 to produce the electromagnetic field configuration 11 and compress the E-layer and plasmoids 12, 13 in the manner previously described. With the mirror field 16, the plasma heating method of the invention is conducted in a manner substantially identical to its conduction with the E-layer except that the portion of the heating derived from interaction of the plasma with the E-layer electrons is dispensed with. More particularly, rotating plasmoids 21, 22 are accelerated proximally through the mirror regions 18, 19 into the central region 17 of the field 16, the plasmoids moving coaxially with reference to the field axis. The formation and acceleration of the plasmoids 21, 22 is accomplished in identical fashion to plasmoids 12, 13. As the plasmoids 21, 22 move through the central region 17 towards each other as indicated in FIGURE 4, they are radially constrained by the field, the radii of gyration of the plasmoids being maintained at a constant value determined by the intensity of the field.

Figure 5:
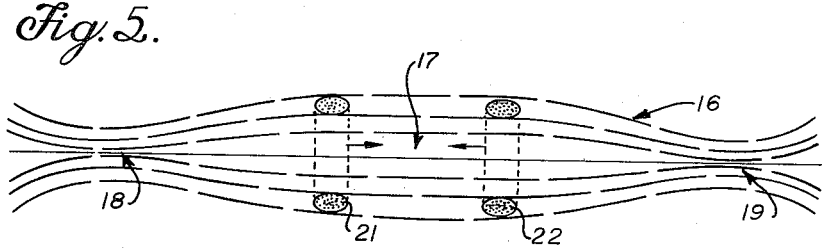
FIGURE 5 is an illustration similar to FIGURE 4 but illustrating the intermediate stages of the method.

Substantially simultaneously with entry of the rotating plasmoids 21, 22 into the central region 17 of the field, the overall field, viz., the central region and mirror regions 18, 19, is rapidly increased in intensity. The plasmoids 21, 22 are thereby adiabatically compressed as shown in FIGURE 5 with an attendant increase in the plasma energy of the plasmoids.

Figure 6:
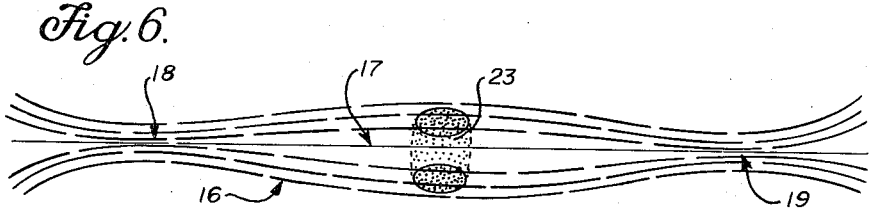
FIGURE 6 is an illustration similar to FIGURES 4 and 5 but illustrating the final stages of the method.

The mirror regions 18, 19 are now further increased to reach peak intensity at substantially the instant the approaching plasmoids collide with a resulting further increase in axial compression just prior to collision. When the plasmoids 21, 22 collide, their tremendous kinetic energy is converted by the collisional shock into heat energy in the resultant plasma mass 23 which is confined in the central region 17 of the peak intensity mirror field 16 as indicated in FIGURE 6. The method of the present invention may thus be employed to produce a high temperature or high energy plasma mass confined within the nonmaterial medium of a magnetic mirror confinement field as well as within an Astron type electromagnetic confinement field configuration.

Considering now preferred apparatus for conducting the methods of the invention described hereinbefore and referring to FIGURE 7 of the drawing, there is shown plasma heating and confining apparatus 24 including an elongated cylindrical vacuum chamber 26 which is evacuated to appropriate low pressure vacuum dimensions by conventional vacuum pump and cold trap means (not shown). Disposed concentrically about the reaction chamber 26 along the entire length thereof is a solenoid 27 which is energized by a D.C. power supply 28 to establish the uniform central field region of the axially symmetric magnetic field of previous mention during the initial stages of the method. In order to establish the gradientally intensified terminal regions of the magnetic field during the initial stages of the method a pair of mirror field solenoids 29, 31 are respectively disposed in concentric spaced relation about the opposite ends of solenoid 27 and, for example, parallel connected to D.C. power supply 28. With solenoids 27, 29, 31 energized with direct current from power supply 28 the axially symmetric magnetic field is established within chamber 26 in steady state fashion and where an E-layer is employed serves to adjust the radius and length thereof to the initial values depicted in FIGURE 1.

As regards establishment of the E-layer, this may be accomplished by any one of several means disclosed in the prior art as referenced hereinbefore. For example, a plurality of axially spaced E-layer injection solenoids 32, 33, 34 may be disposed concentrically within the end region of vacuum chamber 26 encompassed by mirror solenoid 29. In addition an electron injection tube 36 may be extended radially through the wall of reaction chamber 26 into communication with the interior thereof intermediate E-layer injection coils 32, 33. The opposite end of the tube may then be connected to the output end of a source of accelerated electrons, as for example, an electron gun 37 of the variety disclosed in U.S. Patent No. 2,931,939 to Nicholas Christofilos. The E-layer is then established by injection of a continuous succession of electron pulses generated by the gun 37 through the tube 36 into the interior of the vacuum tank 26 wherein by interaction with the axially symmetric magnetic field established by solenoids 27, 29, 31 as well as the magnetic fields generated by injector coils 32, 33, 34 the E-layer of radius $R_0$ and length $L_0$ is established coaxially through the interior of the vacuum chamber 26. Inasmuch as the actual details as to the establishment of the E-layer are of no consequence to the salient aspects of the present invention, they are not presented herein, reference being made to the copending Christofilos application Serial No. 756,044 for a full description of an E-layer injection system substantially as depicted in the embodiment of the present invention illustrated and described herein.

It will be appreciated that the apparatus thus far described is substantially identical to a conventional Astron. Several significant departures from a basic Astron machine are now presented however, to the ends of performing the salient steps of the superfast plasma heating method in accordance with the present invention. More particularly, means are provided at the opposite ends of the reaction chamber 26 for the pulsed formation and injection of the plasmoids 12, 13 of previous mention proximally into the opposite ends of the E-layer 10. Although various means for generating such rotating plasma rings will suggest themselves to those skilled in the art, as mentioned previously, I have found that homopolar generators of the general variety disclosed in the previously referenced U.S. Patent No. 2,997,641 to William R. Baker et al., and appropriately modified to the ends of the present invention as described hereinafter, to be particularly advantageous for this purpose. More specifically, identical modified homopolar plasma generators 38, 39 are disposed in coaxial communication with the opposite ends of reaction chamber 26, such generators being arranged to produce a rotating sheet of plasma and then to form same into a rotating ring or plasmoid accelerated into the reaction chamber with a radius substantially equal that of the E-layer 10. Each of the generators 38, 39 comprises concentric inner and outer electrodes 41, 42 which are closed at their outer ends as by means of an annular insulating closure disc 43. The inner ends of electrodes 41, 42 are closed by means of an annular insulating closure disc 44 having an outer diameter somewhat less than the inner diameter of outer electrode 42 so as to define an annular aperture 46 in the inner end wall of the resulting annular cavity 47 defined between the electrodes and insulating closure discs. A pulsed power supply 48, for example, a charged capacitor bank, is connected through an electronic switch 49, such as paralleled ignitrons, and by means of leads 45 to the inner and outer electrodes 41, 42 to establish a fast rising pulsed radial electric field within chamber 47 upon closure of the switch. In addition, a pair of homopolar magnetic field coils 50, 51 are respectively disposed adjacent the outer faces of insulating closure discs 43, 44 and are connected through leads 55 to a D.C. power supply 52 to generate a magnetic field axially of chamber 47 in orthogonal relation to the radial electric field. A gas inlet 53 is provided in communication with the chamber 47 to introduce a desired gas, e.g., deuterium, thereto whereupon entering the chamber with the magnetic and electric fields therein, the gas is ionized and caused to rotate as a disc about the axis of the chamber in accordance with the basic concept of a homopolar generator as is detailed in the hereinbefore referenced Baker et al. patent. As is well known, such a rotating plasma disc or sheet stores substantial amounts of kinetic energy in its rotation.

Considering now preferred means for forming the rotating plasma discs produced in the homopolar generator chambers into the rotating plasmoids 12, 13 and accelerating same axially into the ends of the E-layer 10 upon its establishment in the reaction chamber 26, it is first to be noted that an annular nozzle 54 is provided for communicably connecting the annular aperture 46 of each of the generators 38, 39 coaxially to the ends of the reaction chamber 26. More particularly, the ends of the reaction chamber 26 are each centrally apertured as indicated generally at 56 with the diameter of the aperture being equal the inner diameter of the outer electrodes 42 of the homopolar generators 38, 39. An annular insulator 57 is secured between each outer electrode 42 and the end wall of the chamber 26 so as to be co-extensive with the rim of aperture 56 and inner wall of the electrode. A ring 58 of high permeability material such as $\mu$-metal is disposed within each insulator 57 in radially spaced relation therefrom. The ring at one end coaxially engages the periphery of annular insulating disc 44 and at the other end is co-terminus with the inner end wall of the reaction chamber 26 so as to define with the insulator 57 an annular nozzle passage 59 in alignment with aperture 46 and extending coaxially into the reaction chamber. The inner end of each ring 58 is provided with a closure disc 61 hermetically sealed therein in order to close the central region of the reaction chamber end walls. It is important to note that the annular nozzle passages 59 are positioned to be in symmetrical coaxial alignment with the E-layer 10 established in the reaction chamber. In other words, the mean radius of the nozzle passages 59 is arranged to be substantially equal to the initial E-layer radius $R_0$.

Figure 8:
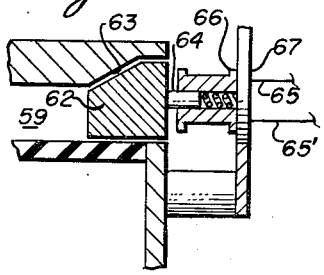
FIGURE 8 is a broken out detail view of the valve of one of the annular plasma injection nozzles of the apparatus of FIGURE 7.

For the purpose of closing the nozzle passages 59 until such time as rotating plasma sheets are formed in the homopolar generator chambers 47 and then opening the passages to permit plasma egress therefrom, appropriate ring valves 62 for example are provided in the outlet ends of the passages. More specifically, the outlet end of each passage 59 is formed with an internal annular shoulder defining a valve seat 63 for receiving the corresponding ring 62. When the ring is seated upon the seat as indicated in full line in FIGURE 8, the nozzle passage is blocked. When the ring is slightly coaxially displaced from the seat toward the chamber 26 as indicated in phantom line, the nozzle passage is opened. In order to selectively open and close the nozzle passages, a plurality of electromagnetically actuated plungers 64 are secured in circumferentially spaced relation to each ring. The plungers extend coaxially into a plurality of actuating electromagnets 66 carried by an annular bracket 67 secured to each end wall of the chamber 26. The plungers are additionally spring loaded to normally retain the rings 62 in passage closing seated position. However, upon energization of the electromagnets 66 with current as supplied, for example, through leads 65 from a pulsed power supply 68, the plungers are magnetically urged in opposition to their spring loading to thereby unseat the rings 62 and open the nozzle passages 59. Various other means for selectively opening and closing the nozzle passages may, of course, be alternatively employed and will suggest themselves to those skilled in the art.

To provide the magnetic fields of previous mention for accelerating the rotating plasma sheets produced in the homopolar generator chambers axially into the reaction chamber 26 and forming same into rotating plasma rings or plasmoids, a shock coil 69 is disposed exteriorly adjacent the outer magnetic field coil 49 of each homopolar generator 38, 39. Each shock coil 69 is connected through leads 70 to a fast rise time pulsed power supply 71, such as a charged capacitor bank, and through an electronic switch 72 such as one or more ignitrons. Upon pulsing the switch 72 in a manner subsequently described the circuits between the power supply 71 and the shock coils 69 are closed and the coils produce a fast rising strong magnetic field at the outer ends of the homopolar generator chambers 47. Such shock fields magnetically accelerate the rotating plasma sheets produced in the generator chambers 47 into the annular nozzle passages 49. At an intermediate time during the rise time period of the shock fields the valves 62 are actuated as by pulsing an electronic switch 73 coupled between power supply 68 and actuating magnets 66. The nozzle passages are thus opened to permit the rotating plasma therein to be accelerated from the passages and into the reaction chamber 26 during the remainder of the rise time of the shock fields. The plasma in passing through the outlet of the nozzle passage is magnetically pinched to form the accelerated rotating plasmoids 12, 13 and this is accomplished by means of a solenoid 74 disposed concentrically about the outer nozzle insulators 57 and energized through leads 75 by a power supply 76. By virtue of the high permeability ring 58 defining the inner wall of each of the nozzle passages 59, the magnetic field generated by the solenoid 74 is shunted through the ring and extends radially outward from the inner end thereof across the exit end of the nozzle passage. The radial field across the exit end of the nozzle is extremely strong whereas the radial field across the inlet end of the nozzle passage is relatively weak. As the plasma is accelerated through each of the annular passages 59 and passes through the strong radial magnetic field at the end thereof, the circumferential current of the rotating plasma interacts with the radial magnetic field to produce forces on the plasma which tend to pinch same into a ring of substantially the same radius as that of the E-layer 10. A force is also produced which further accelerates the resulting rotating plasmoids axially into the chamber 26. The plasmoids 12, 13 hence enter the ends of the E-layer and travel towards each other at extremely high velocities approaching supersonic speed.

As regards the means by which the axially symmetric magnetic field is increased in intensity in steps so as to produce adiabatic compression processes in the plasmoids as well as to compress the E-layer both radially and axially, it is to be noted that a second uniform central field producing solenoid 77 is disposed coaxially about the first similar solenoid 27 with the mirror field solenoids 29, 31 in circumjacent relation to its ends. A second set of mirror field solenoids 78, 79 are respectively concentrically disposed about the first set of mirror field solenoids 29, 31. In addition a third set of mirror field solenoids 81, 82 are coaxially disposed exteriorly adjacent the opposite ends of the reaction chamber 26. The solenoids 77, 78, 79 are connected to a pulsed power supply 83, e.g., a charged capacitor bank, through an electronic switch 84, such as a plurality of paralleled ignitrons. Similarly, the mirror field solenoids 81, 82 are connected to a pulsed power supply 86 through leads 85 and an electronic switch 87. Upon closure of the switch 84 the second uniform central field solenoid 77 and second set of mirror field solenoids 78, 79 are energized to generate an additive axially symmetric magnetic field which increases the overall intensity of the resultant magnetic field in the reaction chamber 26 and compresses the E-layer to the radius $R_1$ and length $L_1$ depicted in FIGURE 2 and also produces the radial and axial adiabatic compression processes in the approaching plasmoids 12, 13 as indicated hereinbefore. Upon closure of the switch 87, the solenoids 81 and 82 are energized to further increase the intensity of the mirror field regions of the axially symmetric magnetic field and compress the E-layer to the length $L_2$ depicted in FIGURE 3 as well as to axially confine the resulting high energy plasma mass 14 produced in the medial region of the E-layer upon collision of the plasmoids 12, 13.

In order that the various events discussed hereinbefore occur in synchronism and in proper sequence in the plasma heating device 24 of the present invention, a programming circuit 88 is provided in operable connection with the various electronic switches 49, 72, 73, 84, 87 to appropriately control their actuation and energize the various components of the plasma heating device in proper order. More particularly, the programming circuit 88 is arranged subsequent to establishment of the E-layer 10 in its initial dimensions, to first effect closure of the switch 49 so as to energize the concentric electrodes 41, 42 of the homopolar generators 38, 39 and establish the time rising homopolar electric fields in the chambers 47 in orthogonal relation to the magnetic fields established therein by solenoids 50, 51. After a predetermined time interval required to establish the rotating plasma sheets within the homopolar generator chambers 47, the programming circuit 88 effects closure of the switch 72 to thereby energize the shock coils 69 with the resulting magnetic shock fields urging the rotating plasmas into the nozzle passages 59. At an intermediate time during the rise time of the shock fields, the programming circuit 88 effects closure of switch 73 to thereby actuate the valves 62 to open position and permit the plasma to egress from the nozzles. After a second predetermined time interval required for the resulting plasmoids 12, 13 to enter the opposite ends of the E-layer 10, the programming circuit 88 effects closure of the switches 84 and 87 in rapid succession. The axially symmetric magnetic field within the reaction chamber 26 is responsively increased in intensity so as to compress the E-layer and approaching accelerated plasmoids 12, 13 therein as discussed hereinbefore.

The overall operation of the superfast plasma heating device 24 of the present invention generally follows from the method thereof set forth hereinbefore. More particularly, with the apparatus constructed as described hereinbefore, the solenoids 27, 29 and 31 are energized with D.C. current from power supply 28 and the E-layer 10 is established within the chamber 26 by introducing electrons from electron gun 37 into the reaction chamber and appropriately energizing the E-layer injector coils 32, 33, 34, the latter operation of establishing the E-layer being accomplished as fully described in the Christofilos copending application Serial No. 756,044. With the E-layer established to have the initial dimensions $R_0$ and $L_0$, the axial magnetic fields are established in the homopolar generator reaction chambers 47 by applying D.C. voltage from power supply 52 to the solenoids 50, 51 of the generators. A gas, such as deuterium, is now introduced to the homopolar generator reaction chambers 47 through the gas inlets 53 and the programming circuit 88 is placed into operation. The programming circuit effects closure of switch 47 to thereby generate the homopolar generator time rising radial electric fields in the chambers 47. The orthogonal electric and magnetic fields in each chamber ionize the gas introduced thereto to form a plasma and the resultant forces of the fields upon the plasma particles cause the plasma to rotate as a sheet about the axis of the chamber in a manner well known in the art. The electronic switch 72 is now closed under the control and direction of programming circuit 88 such that the shock coils 69 are energized with time rising current from pulsed power supply 71. The resulting rapidly rising magnetic shock fields produced in the homopolar reaction chambers 47 axially outward from the inlet ends of the nozzle passages 59 tend to accelerate the rotating plasma in the chambers axially inward through the nozzle passages. Slightly after the start of energization of the shock coils the programming circuit effects closure of switch 73 to thereby open the valves 62 previously blocking passage of charged particles through the ends of the nozzle passages. The accelerated plasma is hence free to pass axially through the ends of the nozzle passages and through the strong radial magnetic fields established thereacross by solenoids 74. Upon passing through the strong radial magnetic fields the rotating plasma particles interact therewith to create forces which pinch the plasma into the rotating plasmoids 12, 13 and accelerate them at substantially supersonic speeds proximally into the opposite ends of the E-layer 10. As the plasmoids enter the E-layer, the programming circuit 88 closes switches 84 and 86 to thereby effect energization of the solenoids 77, 78, 79, 81, 82 and intensify the uniform central field region and mirror field regions of the axially symmetric magnetic field within the reaction chamber 26. Such increase in the magnetic field intensity compresses the E-layer to the radius $R_1$ and to the length $L_1$, the approaching plasmoids 12, 13 being simultaneously adiabatically compressed in both the radial and axial directions to materially increase the kinetic energy of the constituents thereof. The final E-layer length $L_2$ is reached at substantially the instant that the plasmoids 12, 13 collide whereupon the kinetic energy is shock converted to heat energy in the resulting plasma mass 14 arising from the collision of the plasmoids. The already very high temperature plasma mass is restrained in the electromagnetic field pattern of the compressed E-layer as schematically depicted in FIGURE 3 and thereafter is further increased in temperature by interaction with the relativistic electrons of the E-layer in accordance with the basic considerations of a conventional Astron device.

By virtue of the extremely small plasma volume attained in the compressed E-layer the plasma density is extremely high and by virtue of the high plasma temperature attained the energetic plasma particles undergo collisions at a high rate. Where deuterons are utilized as the pulasma ions, substantial pair reactions occur by virtue of the collisions and neutrons are attendantly produced in copious quantities. The very high temperature of the plasma is maintained by virtue of the negligible electron and ion leakage and runaway electron effects as well as negligible thermal losses attained by the pulsed mode of operation of the present invention. Subsequent to attainment of maximum plasma temperature, the programming circuit 88 permits decay of the axially symmetric magnetic field in the reaction chamber 26 to its initial steady state value and also de-energizes the shock coils 69 and homopolar generator electrodes 41, 42 by opening the electronic switches associated therewith. Thereafter, the programming circuit 88 repetitiously effects additional cycles of operation which occur in the same manner as that just described.

As an example of one embodiment of the plasma heating apparatus 24 arranged to produce a final plasma density of the order of $10^{16}$ particles per cubic centimeter and temperature of 100 kev., the parameters of such embodiment are as follows:

Reaction chambers:
    Diameter—40 centimeters
    Length—300 centimeters
E-layer:
    Diameter—20 centimeters (initial)
    Length—200 centimeters (initial)
Central magnetic field coils:
    First stage—10,00 gauss (steady)
    Second stage—80,000 gauss (one sec. rise time)
Mirror field coils:
    First stage—30,000 gauss (steady)
    Second stage—100,000 (one sec. rise time)
    Third stage—200,000 gauss (one sec. rise time)
Homopolar generators:
    Depth—10 centimeters
    Diameter—20.5 centimeters
    Axial field—20,000 gauss
    Electric field—200 kilovolts (approx. 2 milliseconds rise time)
Shock coil: 100,000 gauss (approx. 2 millisecond rise time)
Radial field coil: 50,000 gauss.

It will be appreciated that although the plasma heating apparatus 24 has been hereinbefore discussed relative to the conduct of the method in the electromagnetic confinement field configuration associated with an E-layer, the apparatus may as well be utilized to conduct the method in a magnetic mirror confinement field configuration as previously discussed with reference to FIGURES 4 and 6. More particularly, with the electron gun 37 and E-layer injector coils 32, 33, 34 de-energized, the apparatus conducts the plasma heating process in a mirror field configuration in a like manner as that described relative to the apparatus with E-layer included.

While the invention has been disclosed herein with respect to specific steps in the method and a single preferred embodiment of the apparatus, it will be apparent that numerous variations and modifications may be made within the spirit and scope of the invention, and thus it is not intended to limit the invention except by the terms of the following claims.

What is claimed is:

1. Plasma heating apparatus comprising means defining an evacuated space, means for generating within said space an axially symmetric field having a configuration conducive to the axial and radial confinement of charged particles therein, means for generating rotating plasmoids coaxially adjacent opposite ends of said field, means for accelerating said plasmoids proximally through said field from the opposite ends thereof, and means for adiabatically compressing said plasmoids during their acceleration through said field.

2. Plasma heating apparatus comprising a vacuum envelope having coaxially aligned annular apertures at its opposite ends, magnetic field generating means carried by said envelope for generating an axially symmetric magnetic containment field therein defined by a substantially uniform central region terminally bounded by gradientally-intensified regions, said field having a constant intensity relative to time during an initial time increment and thereafter rising rapidly in intensity relative to time, magnetic field means carried by said envelope for generating strong radial magnetic fields across said annular apertures, rotating plasma generating means communicating with said apertures for producing rotating plasma exteriorly adjacent each one thereof, and magnetic shock field generating means disposed exteriorly adjacent said apertures for generating fast rising magnetic fields for accelerating said rotating plasma coaxially through said apertures and into said gradientally-intensified regions of said containment field simultaneously with termination of said initial time increment thereof.

3. Plasma heating apparatus according to claim 2, further defined by E-layer injection means carried by said envelope for generating a cylindrical layer of relativistic electrons rotating about the axis of said containment field and having a radius during the initial time increment thereof equal to the mean radius of said annular apertures.

4. Plasma heating apparatus comprising an elongated cylindrical vacuum envelope having coaxially aligned annular apertures in its opposite ends, annular nozzles disposed exteriorly adjacent the ends of said envelope and coaxially communicating with said apertures, said nozzles each having an inner cylindrical wall member of high permeability material, solenoid means disposed concentrically about said nozzles and producing magnetic fields with flux lines extending radially across said apertures, annular homopolar generator chambers disposed coaxially exteriorly adjacent said nozzles, said chambers respectively defined by concentric electrodes closed at their outer ends by insulating closure discs and having insulating walls at their inner ends spaced radially inward from the outer electrodes to define marginal annular openings communicating with said nozzles, magnetic field generating means carried by said generators and establishing uniform axially symmetric magnetic fields longitudinally through the chambers thereof, gas inlet means communicating with said chambers for admitting gas thereto, shock coils respectively disposed exteriorly coaxially adjacent said generator chambers, electromagnetically actuated valve means seated in the inner ends of said nozzles and normally closing same, said valve means operable upon actuation to open said nozzles, a first stage uniform containment field solenoid disposed concentrically about said envelope and extending along the length thereof, a second stage uniform containment field solenoid disposed concentrically about said first stage solenoid and extending along its length, first stage closure field solenoids respectively concentrically disposed about the opposite ends of said second stage uniform containment field solenoid, power supply means energizing said first stage uniform and closure field solenoids to establish a first stage axially symmetric magnetic containment field longitudinally through said envelope, said containment field having a substantially uniform central region terminally bounded by end closure regions of increased intensity and being constant with respect to time, second stage closure field solenoids disposed concentrically about said first stage closure field solenoids, third stage closure field solenoids disposed coaxially exteriorly adjacent the opposite ends of said envelope and concentrically within said nozzles, and programmed pulsed power supply means for pulsing said homopolar generator electrodes, said shock coils, said electromagnetically actuated valve means, said second stage uniform and closure field solenoids, and said third stage closure field solenoids in rapid succession.

5. Plasma heating apparatus according to claim 4, further defined by E-layer injector means carried by said envelope for generating a cylindrical layer of relativistic electrons rotating about the axis of said containment field and having a radius during the first stage thereof equal to the mean radius of the annular apertures in the ends of the envelope.

No references cited.